United States Patent [19]
Ishii

[11] Patent Number: 5,133,309
[45] Date of Patent: Jul. 28, 1992

[54] MULTI-POPPET VALVE TYPE TWO CYCLE ENGINE

[75] Inventor: Mitsunori Ishii, Yokohama, Japan

[73] Assignee: Nissan Motor Co., Ltd., Yokohama, Japan

[21] Appl. No.: 618,621

[22] Filed: Nov. 27, 1990

[30] Foreign Application Priority Data

Nov. 27, 1989 [JP] Japan .................................. 1-307312

[51] Int. Cl.⁵ .............................................. F02B 75/02
[52] U.S. Cl. .................................. 123/65 V; 123/52 M
[58] Field of Search ............ 123/65 V, 65 E, 65 VC, 123/52 M

[56] References Cited

U.S. PATENT DOCUMENTS

| | | | |
|---|---|---|---|
| 2,474,879 | 7/1949 | Winfield | 123/65 V |
| 2,476,477 | 7/1949 | Lucke | 123/65 V |
| 4,834,048 | 5/1989 | Adamis et al. | 123/52 M |
| 4,995,354 | 2/1991 | Morikawa | 123/65 V |

FOREIGN PATENT DOCUMENTS

| | | | |
|---|---|---|---|
| 63-208635 | 8/1988 | Japan | 123/65 V |
| 63-134147 | 9/1988 | Japan | 123/65 V |

Primary Examiner—Raymond A. Nelli
Attorney, Agent, or Firm—Foley & Lardner

[57] ABSTRACT

In an engine wherein there is only one exhaust valve per cylinder, the single exhaust valve is maintained closed while an inlet valve, via which an air-fuel mixture is exclusively admitted to the combustion chamber, is open. A second inlet valve, via which only air is supplied into the combustion chamber, is arranged to open when the exhaust valve is opened. In this manner, fuel is prevented from passing through the combustion chamber to the exhaust system. While the second inlet valve is open, air which contains no fuel is used to scavenge the combustion gases. In engines wherein there are two exhaust valves per cylinder, it is possible for a stoichiometric air-fuel mixture to be formed in the combustion chamber. In this configuration one of the two exhaust valves is opened during an initial stage of the exhaust phase, and the combustion gases are exhausted into a three-way catalytic converter. The first exhaust valve can then be closed and the other exhaust valve opened for essentially the same time period that the inlet valve, via which only air is supplied is open. A mixture of combustion gases and scavenging air can accordingly be exhausted into an oxidizing type converter.

13 Claims, 3 Drawing Sheets

MULTI-POPPET VALVE TYPE TWO CYCLE ENGINE

BACKGROUND OF THE INVENTION

1. Field of the Invention

The present invention relates generally to a two cycle or two stroke engine and more specifically to a supercharged two cycle engine.

2. Description of the Prior Art

JP-A-63-208635 discloses a two cycle engine wherein two induction ports are provided per cylinder and wherein each port contains a fuel injector.

However, with this type of two cycle engine, the overlap of the inlet and exhaust valve timing is relatively large, and fuel which is injected toward the inlet valves tends to pass through the combustion chamber and enter the exhaust system via the exhaust port or ports. This of course increases the amount of HC emission of the engine considerably.

In order to overcome this problem it has been proposed to inject the fuel directly into the combustion chamber. However, in this case, fuel atomization tends to be inadequate and results in deteriorated combustion characteristics.

SUMMARY OF THE INVENTION

It is an object of the present invention to provide a multi-valve type two cycle engine which uses non-direct fuel injection and which enables the reduction of HC emission levels.

In brief, the above object is achieved by a two cycle engine arrangement wherein, when there is only one exhaust valve per cylinder, this single exhaust valve is maintained closed while an inlet valve, via which air-fuel mixture is exclusively admitted to the combustion chamber, is open. A second inlet valve via which only air is supplied into the combustion chamber, is arranged to open with an extensive overlap of the single exhaust valve. In this manner fuel is prevented from passing through the combustion chamber to the exhaust system. While the second inlet valve is open, air which contains no fuel is permitted to scavenge the combustion gases.

In engines wherein there are two exhaust valves per cylinder, a stoichiometric air-fuel mixture is formed in the combustion chamber, one of the two exhaust valves is opened during an initial stage of the exhaust phase, and the combustion gases are exhausted into a three-way catalytic converter Following this, the first exhaust valve is closed and the other is opened with an essentially full overlap of the inlet valve via which only air is supplied. A mixture of combustion gases and scavenging air is then exhausted into an oxidizing type converter.

In both of the above cases, it is possible to supercharge the engine and take advantage of the fact that while one inlet valve is open the other is closed. Thus, during the induction phase, the flow of pressurized air exclusively passes through a passage which leads to the first inlet valve. Fuel is exclusively supplied into this passage and accordingly promotes the formation of a well carburetted air fuel mixture in the combustion chamber. During the exhaust phase, the supercharged air flow passes exclusively through a passage which leads to the second valve and into which fuel is not supplied. This improves the efficiency with which the combustion gases can be scavenged while preventing the transfer of unburned fuel directly from the induction system to the exhaust manifold.

By arranging a throttle valve or valves to control only the flow of air through the passages via which an air-fuel mixture is supplied to the combustion chambers, an essentially unrestricted flow of air is made available for scavenging the combustion gases out of the combustion chamber.

More specifically, a first aspect of the present invention comes in a two cycle engine which features: a cylinder in which a piston is reciprocatively disposed in a manner to define a combustion chamber; first and second inlet passages which communicate with the combustion chamber by way of first and second separate inlet ports, respectively; first and second inlet valves which control the first and second inlet ports respectively; an exhaust conduit which communicates with the combustion chamber by way of an exhaust port; an exhaust valve which controls the exhaust port; means for supplying fuel exclusively into the second inlet passage; means for controlling the opening and closing of the first and second inlet valves and the exhaust valve so that the exhaust valve is closed while the second inlet valve, via which air-fuel mixture is exclusively admitted to the combustion chamber, is open, and the first inlet valve via which only air is supplied into the combustion chamber is open with an extensive overlap of the exhaust valve to scavenge the combustion gases from the combustion chamber.

A second aspect of the present invention comes in a two cycle engine which features: a cylinder in which a piston is reciprocatively disposed in a manner to define a combustion chamber; first and second inlet passages which communicate with the combustion chamber by way of first and second separate inlet ports, respectively; first and second inlet valves which control the first and second inlet ports respectively; first and second exhaust conduits which communicates with the combustion chamber by way of first and second exhaust ports respectively; first and second exhaust valves which control the first and second exhaust ports respectively; means for supplying fuel exclusively into the second inlet passage; means for controlling the opening and closing of the first and second inlet valves and the first and second exhaust valves so that the first and second exhaust valves are closed while the second inlet valve, via which air-fuel mixture is exclusively admitted to a combustion chamber, is open; so that the first exhaust valve is open with a small overlap of the first inlet valve and while the second inlet valve is closed; and so that the first inlet valve via which only air is supplied into the combustion chamber is open with an extensive overlap of the second exhaust valve to scavenge the combustion gases from the combustion chamber.

A third aspect of the present invention comes in a method of operating a multi-valve two cycle engine which features the steps of: maintaining an exhaust valve closed while a first inlet valve, via which air-fuel mixture is exclusively admitted to a combustion chamber, is open; opening a second inlet valve via which only air is supplied into the combustion chamber with an extensive overlap of the exhaust valve to scavenge the combustion gases from the combustion chamber.

A fourth aspect of the present invention comes in a method of operating a two cycle engine which has two inlet valves and two exhaust valves per cylinder, the steps of: opening a first exhaust valve during a initial stage of the exhaust phase; exhausting combustion gases into a three-way catalytic converter by way of the first exhaust valve; closing first exhaust valve and opening a second exhaust valve an essentially full overlap of a first inlet valve via which only air is supplied into the combustion chamber; exhausting a mixture of combustion gases and scavenging air into an oxidizing type converter by way of the second exhaust valve; and supplying an air-fuel mixture into the combustion chamber by way of a second inlet valve when both of the first and second exhaust valves are closed.

DESCRIPTION OF THE PREFERRED EMBODIMENTS

Figure 1:
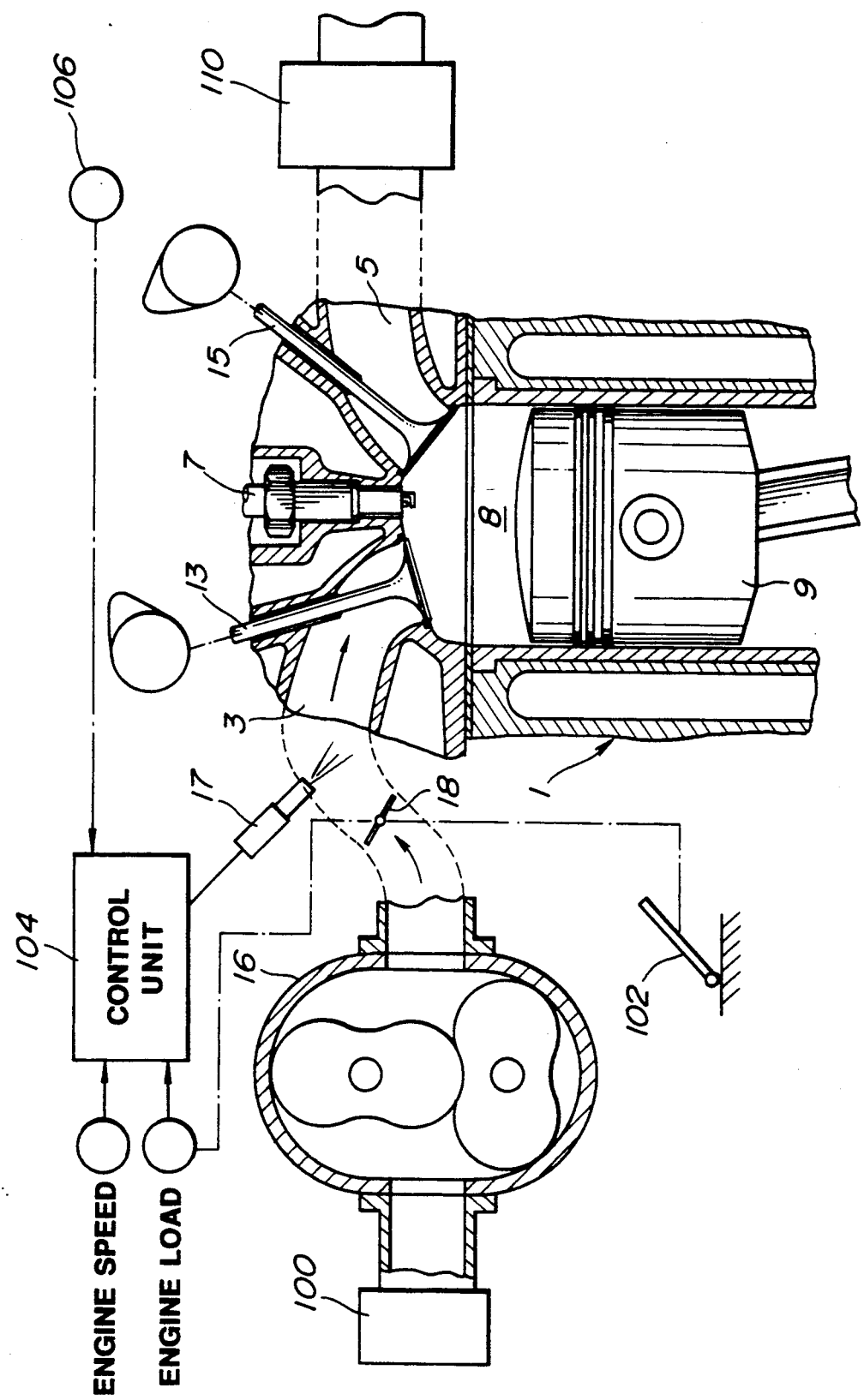
FIG. 1 is a sectional elevation showing an embodiment of the present invention.
Figure 2:
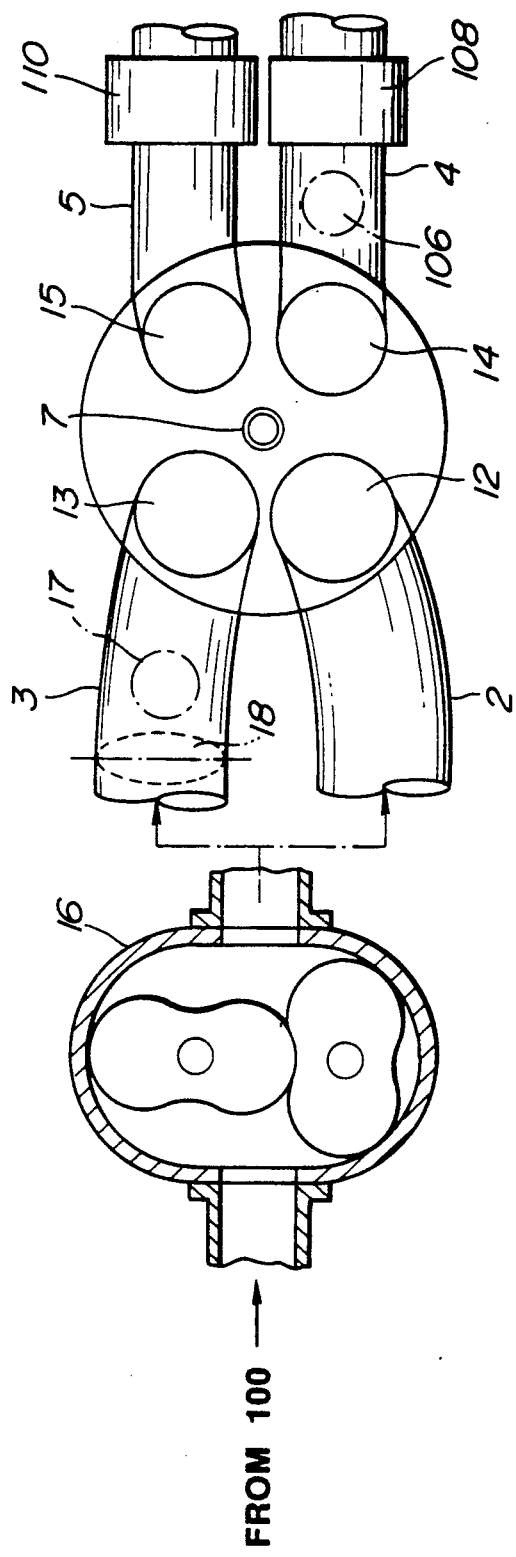
FIG. 2 is a schematic plan view showing the layout of the inlet and outlet ports used in the FIG. 1 arrangement.

FIGS. 1 and 2 show an embodiment of the present invention. In this arrangement, each cylinder of the two cycle engine is provided with main and auxiliary induction ports 2, 3 and primary and secondary exhaust ports 4 and 5.

Primary and secondary inlet valves 12, 13 are used to control the primary and second inlet ports 2 and 3 respectively, while primary and secondary exhaust valves 14, 15 are used to control the primary and secondary exhaust ports 4 and 5. A spark plug 7 is disposed in the illustrated position.

A supercharger 16 is disposed in the induction system upstream of the inlet ports 2, 3 and arranged to induct fresh air via an air cleaner 100, and compress and discharge the same into the induction manifold.

A fuel injector 17 is arranged to inject fuel into the secondary induction port 3 at a location downstream of a throttle valve 18. As shown, the throttle valve 18 is operatively connected with an accelerator pedal 102, or the like type of manually operable member, and arranged to control the amount of air which is supplied to the combustion chamber 8 by way of the secondary induction port 3.

The fuel injector 17 is operated by a control unit 104 which is responsive to throttle valve position (engine load) and engine speed. An air-fuel ratio sensor 106 is disposed in the exhaust system and arranged to provide feedback information via which the injection amount can be controlled to form a stoichiometric air-fuel mixture.

In this embodiment there is no throttle valve disposed in the primary induction port 2 and no fuel is injected thereinto. This port 2 is used to supply only pressurized supercharged air into the combustion chamber 8 by way of the primary inlet valve 12.

A three-way catalytic converter 108 is disposed in the exhaust system and arranged to communicate with the primary exhaust port 4. An oxidizing type converter 110 is disposed in the exhaust system and arranged to communicate with the secondary exhaust port 5.

Figure 3:
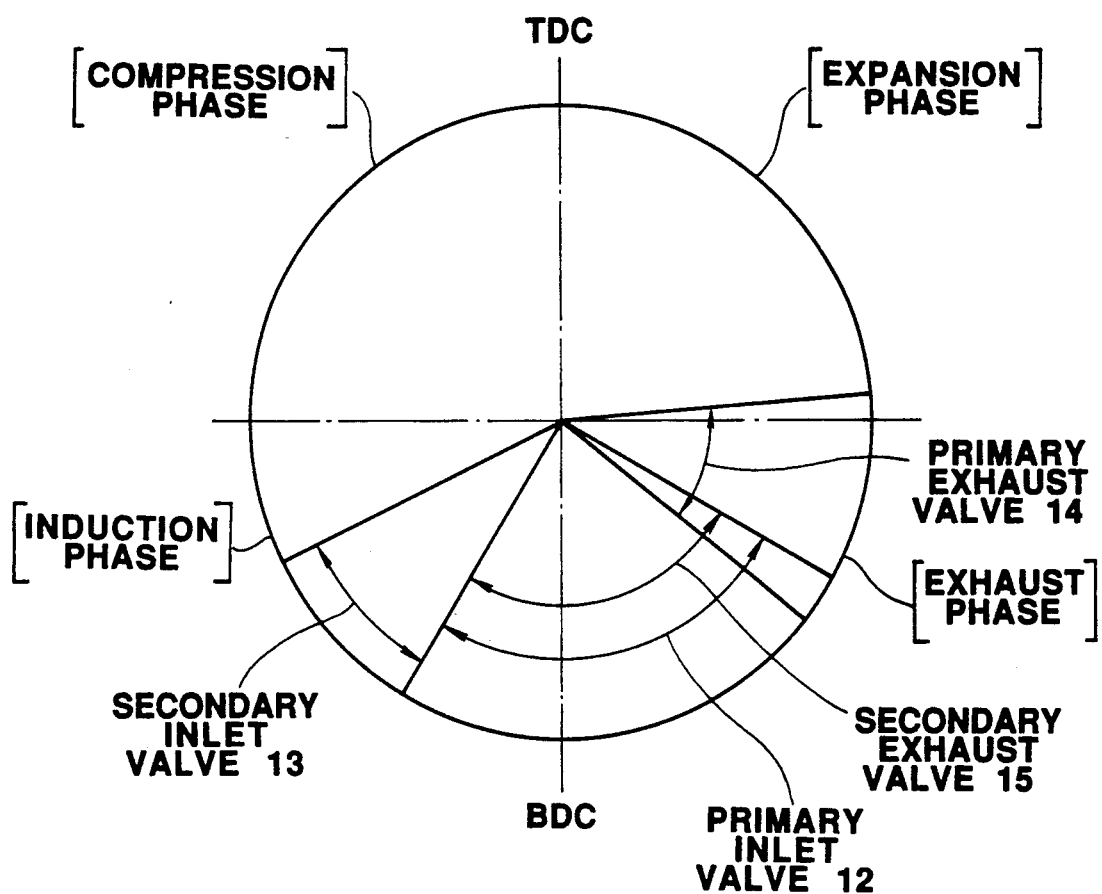
FIG. 3 is a timing diagram which shows the valve timing which characterizes the present invention.

FIG. 3 shows the timing with which the inlet and exhaust valves 12-15 are opened and closed. As will be appreciated from this diagram, the primary and secondary exhaust valves 14, 15 are arranged to open one after the other (sequentially) and with a predetermined overlap. The primary and secondary inlet valves 12, 13 are similarly arranged to open one after the other. The primary exhaust valve 14 is arranged to close prior to the piston 9 descending to BDC, while the secondary exhaust valve 15 is induced to open during a period which begins prior to BDC and which terminates in the induction phase at a timing following BDC.

The primary inlet valve 12 is arranged to open and close with essentially the same timing as the secondary exhaust valve 15 and fully overlap the same.

As the piston 9 ascends during the compression phase, the secondary inlet valve 13 opens for a relatively short period following the closure of the primary inlet and secondary exhaust valves 12, 15.

It should be noted that it is within the scope of the present invention to open the secondary inlet valve 13 before the closure of the primary inlet and secondary exhaust valves 12, 15 and to permit a given small amount of overlap to occur.

OPERATION

As is well know the induction, compression, expansion and exhaust phases all occur during each revolution of a two cycle engine.

With the present invention, as the piston descends toward BDC (see FIG. 3) the primary exhaust valve 14 opens and the combustion gases are exhausted by way of the primary exhaust port to the three-way catalytic converter. Shortly before the primary exhaust valve 14 closes, the primary inlet valve 12 opens. However, as thre is very little overlap, the amount of fresh air which is permitted to reach the primary exhaust passage 4 is negligible. This enables the stoichiometric air fuel ratio of the combustion gases which reach the three-way catalytic converter 108, to be maintained with reasonable accuracy. As the secondary inlet valve 13 is closed at this time no fuel is permitted to enter the combustion chamber.

In this embodiment, the secondary exhaust valve 15 is arranged to open with the same timing as the primary inlet valve 12. These valves remain open until after BDC. As a result, the supercharged air from the primary inlet port 2 is permitted to flow into the combustion chamber 8 via the primary inlet valve 12 and exhausted via the secondary exhaust port 5. This of course scavenges the combustion chamber 8.

The mixture of the scavenging air and the combustion gases which are released from the combustion chamber 8 via the secondary exhaust port 5, mix and enter the oxidizing type converter wherein oxidation of the HC and CO content thereof takes place.

It will be noted that as the primary induction port 2 does not have fuel supplied thereinto, fuel is not permitted to flow through the combustion chamber and is thereby prevented from reaching either of the exhaust ports 4 and 5.

Accordingly, with the present invention, the fuel which is injected into the secondary induction port 3 by the fuel injector 18, undergoes mixing with the pressurized supercharged air from the super charger 16 and assumes a well carburized condition as it flows into the combustion chamber 8.

As the secondary inlet valve 13 opens after the exhaust valves 14, 15 are closed, non-combusted fuel is not permitted to be released from the combustion chamber during the exhaust phase. As a result, both fuel consumption and emission levels are reduced. Further, the fuel which is injected becomes mixed with a flow of pressurized air from the supercharger 16 as it flows into the combustion chamber 8. This improves the manner in which the fuel mixes with the air, results in a more finely carburetted mixture and facilitates the lowering of emission levels.

It should be noted that it is within the scope of the present invention to apply the above described technique to two cycle engines which have only one exhaust valve per cylinder.

What is claimed is:

1. A two cycle engine comprising:
   a cylinder having a reciprocating piston disposed therein such that a combustion chamber is defined between said cylinder and said reciprocating piston;
   first and second inlet passages which communicate with said combustion chamber by way of first and second inlet ports, respectively, wherein only air flows through said first inlet passage and an air-fuel mixture flows through said second inlet passage;
   a first inlet valve capable of being moved into a closed first inlet valve position and an open second inlet valve position, thereby closing and opening said first inlet port, respectively;
   a second inlet valve capable of being moved into a closed second inlet valve position and an open second inlet valve position, thereby closing and opening said second inlet port respectively;
   an exhaust conduit which communicates with the combustion chamber by way of an exhaust port;
   an exhaust valve capable of being moved into a closed exhaust valve position and an open exhaust valve position thereby closing and opening said exhaust port, respectively;
   means for supplying fuel exclusively into said second inlet passage; and
   means for controlling movement of said first and second inlet valves and said exhaust valve so that 1) said first inlet valve, via which only air is supplied into the combustion chamber, is in said open first inlet valve position during essentially the same period that said exhaust valve is in said open exhaust valve position thereby allowing combustion gases from the combustion chamber to be scavenged, and 2) the exhaust valve is in said closed exhaust valve position when the second inlet valve, via which the air-fuel mixture is exclusively admitted to the combustion chamber, is in said open second inlet valve position.

2. A two cycle engine as claimed in claim 1 further comprising a throttle valve, disposed in said second inlet passage, for controlling an amount of air which flows through said second inlet passage.

3. A two cycle engine as claimed in claim 1 further comprising a supercharger which supplies pressurized air into said first and second inlet passages.

4. A two cycle engine as claimed in claim 1, wherein said first and second inlet valves are poppet valves.

5. A two cycle engine as claimed in claim 1, wherein said exhaust valve is a poppet valve.

6. A two cycle engine comprising:
   a cylinder having a reciprocating piston disposed therein such that a combustion chamber is defined between said cylinder and said reciprocating piston;
   first and second inlet passages which communicate with said combustion chamber by way of first and second inlet ports, respectively, wherein only air flows through said first inlet passage and an air-fuel mixture flows through said second inlet passage;
   a first inlet valve capable of being moved into a closed first inlet valve position and an open second inlet valve position, thereby closing and opening said first inlet port, respectively;
   a second inlet valve capable of being moved into a closed second inlet valve position and an open second inlet valve position, thereby closing and opening said second inlet port respectively;
   first and second exhaust conduits which communicate with the combustion chamber by way of first and second exhaust ports, respectively;
   a first exhaust valve capable of being moved into a first exhaust valve closed position and a first exhaust valve open position thereby closing and opening said first exhaust port respectively;
   a second exhaust valve capable of being moved into a second exhaust valve closed position and a second exhaust valve open position, thereby closing and opening said second exhaust port, respectively;
   means for supplying fuel exclusively into said second inlet passage;
   means for controlling movement of said first and second inlet valves and said first and second exhaust valves in the following sequence
   1) the first exhaust valve is opened,
   2) the second exhaust valve is opened at a first time which is close to a second time at which the first exhaust valve is closed,
   3) the first inlet valve, via which only air is introduced into the combustion chamber, is opened and combustion gases in the combustion chamber are scavenged by way of the second exhaust valve,
   4) the second exhaust valve is closed,
   5) the first inlet valve is closed, and
   the second inlet valve, via which the air-fuel mixture is exclusively admitted to the combustion chamber, is opened for a predetermined period.

7. A two cycle engine as claimed in claim 6 further comprising a supercharger which supplies air under pressure into both of said first and second inlet passages.

8. A two cycle engine as claimed in claim 6 further comprising a three-way catalytic converter which receives exhaust gases which flow through said first exhaust passage and simultaneously reduces concentrations of $NO_x$, HC and CO in said exhaust gases; and
   an oxidizing type converter which receives exhaust gases which flow through said second exhaust passage.

9. A two cycle engine as claimed in claim 6, wherein said first and second inlet valves are poppet valves and said first and second exhaust valves are poppet valves.

10. A two cycle engine as claimed in claim 8 further comprising an air-fuel ratio sensor disposed in said first exhaust passage, said air-fuel ratio sensor being operatively connected to said fuel supply means for inducing said fuel supply means to supply fuel into said second inlet passage so that a stoichiometric air-fuel mixture is formed in said combustion chamber.

11. A method of operating a multi-valve two cycle engine having first and second inlet valves and an exhaust valve per cylinder, comprising the steps of:
   opening the exhaust valve;
   opening the first inlet valve such that only air is introduced into a combustion chamber;

scavenging combustion gases from the combustion chamber using the air which is supplied via the first inlet valve;

closing the exhaust valve;

closing the first inlet valve; and opening the second inlet valve while the exhaust valve is closed so that an air-fuel mixture is exclusively admitted into the combustion chamber via the second inlet valve.

12. A method of operating a two cycle engine which has first and second inlet valves and first and second exhaust valves per cylinder, comprising the steps of:

opening the first exhaust valve during an initial stage of an exhaust phase;

exhausting combustion gases into a three-way catalytic converter by way of the first exhaust valve;

closing the first exhaust valve;

opening the second exhaust valve, and opening the first inlet valve such that only air is supplied into the combustion chamber;

exhausting a mixture of combustion gases and scavenging air into an oxidizing type converter by way of the second exhaust valve;

closing the second exhaust valve and said first inlet valve; and opening the second inlet valve to supply an air-fuel mixture into the combustion chamber when both the first and second exhaust valves are closed.

13. A method as claimed in claim 12 further comprising the steps of forming an essentially stoichiometric air-fuel mixture in said combustion chamber and combusting the same;

sensing the air-fuel ratio of the combustion gases flowing through said first exhaust valve and;

feedback controlling the air-fuel ratio of the air-fuel mixture which is supplied into said combustion chamber by way of said second inlet valve.

* * * * *